(12) United States Patent
Williams et al.

(10) Patent No.: US 10,810,196 B2
(45) Date of Patent: Oct. 20, 2020

(54) MATERIALIZED VIEW GENERATION

(71) Applicant: Hewlett-Packard Development Company, L.P., Houston, TX (US)

(72) Inventors: Kevin Williams, San Diego, CA (US); Amit Kumar Singh, Houston, TX (US); Gaurav Roy, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 323 days.

(21) Appl. No.: 15/840,727

(22) Filed: Dec. 13, 2017

(65) Prior Publication Data
US 2019/0179941 A1 Jun. 13, 2019

(51) Int. Cl.
*G06F 16/00* (2019.01)
*G06F 16/2453* (2019.01)

(52) U.S. Cl.
CPC .. *G06F 16/24535* (2019.01); *G06F 16/24539* (2019.01)

(58) Field of Classification Search
CPC ......... G06F 16/24535; G06F 16/24539; G06F 16/00; G06F 17/30451; G06F 17/30
See application file for complete search history.

(56) References Cited

U.S. PATENT DOCUMENTS

| | | | |
|---|---|---|---|
| 5,418,950 A * | 5/1995 | Li | G06F 16/2428 715/781 |
| 6,374,263 B1 | 4/2002 | Bunger et al. | |
| 6,421,648 B1 * | 7/2002 | Gagnon | G06Q 30/02 705/1.1 |
| 6,480,836 B1 | 11/2002 | Colby et al. | |
| 6,618,719 B1 * | 9/2003 | Andrei | G06F 16/24547 |
| 7,007,235 B1 * | 2/2006 | Hussein | H04L 12/1822 715/751 |
| 9,235,620 B2 | 1/2016 | Ciabrini et al. | |
| 9,535,664 B1 * | 1/2017 | Foster | G06F 8/48 |
| 2004/0215626 A1 * | 10/2004 | Colossi | G06F 16/24542 |
| 2006/0265385 A1 * | 11/2006 | Agrawal | G06F 16/256 |
| 2008/0177700 A1 | 7/2008 | Li et al. | |
| 2008/0201355 A1 * | 8/2008 | Bloesch | G06F 16/284 |
| 2008/0228829 A1 * | 9/2008 | Crutchfield | G06F 16/248 |

(Continued)

OTHER PUBLICATIONS

"Database SQL Tuning Guide"; https://docs.oracle.com/database/121/TGSQL/tgsql_transform.htm#TGSQL206; 2014.

*Primary Examiner* — Anh Ly
(74) *Attorney, Agent, or Firm* — Perry + Currier Inc

(57) ABSTRACT

There is provided a method including determining whether a selection of database query identifiers is to be made in a fixed manner or a dynamic manner. The method also includes generating a collection including the selection from a list including database query identifiers related to a database. When the selection is to be made in the fixed manner, the selection of the database query identifiers includes a view name and/or database query logic. When the selection is to be made in the dynamic manner, the selection of the database query identifiers includes a corresponding view name. The method also includes generating a materialized view corresponding to a given database query identifier in the collection. Moreover, the method includes storing an identifier of the materialized view in association with the given database query identifier.

18 Claims, 9 Drawing Sheets

(56) References Cited

U.S. PATENT DOCUMENTS

| | | | |
|---|---|---|---|
| 2009/0024571 A1* | 1/2009 | Thiyagarajan | G06F 16/24539 |
| 2012/0102420 A1* | 4/2012 | Fukahori | H04L 51/32 |
| | | | 715/771 |
| 2014/0214857 A1* | 7/2014 | Srinivasan | G06F 16/80 |
| | | | 707/748 |
| 2014/0280334 A1* | 9/2014 | LeBlanc | G06F 21/6227 |
| | | | 707/770 |
| 2017/0031976 A1* | 2/2017 | Chavan | G06F 16/23 |
| 2017/0097970 A1* | 4/2017 | Bendel | G06F 16/252 |

\* cited by examiner

400

| ID (405) | Database Query Identifier (410) | Materialized View Identifier (415) |
|---|---|---|
| 1 | viewname-1 | identifier-1 |
| 2 | viewname-2 | identifier-2 |
| 3 | v-name-3 | identifier-3 |
| 4 | select * from sourcetable1 | identifier-4 |

| ID (930) | Database Query Identifier (935) |
|---|---|
| 1 | accounting-staff |
| 2 | legal-staff |
| 3 | admin-staff-recent |
| 4 | select HR from employeetable |
| 5 | sales-staff |
| 6 | select engineering from employeetable |
| 7 | finance-staff |

910

| ID (940) | Database Query Identifier (945) |
|---|---|
| 1 | accounting-staff |
| 2 | legal-staff |
| 3 | admin-staff-recent |
| 4 | select HR from employeetable |

915

| ID (950) | Database Query Identifier (955) |
|---|---|
| 1 | accounting-staff |
| 2 | legal-staff |
| 5 | sales-staff |
| 7 | finance-staff |

920a

| First Name | Last Name | Department |
|---|---|---|
| John | Smith | accounting |
| Jane | Doe | accounting |
| Alex | Trier | accounting |
| Darren | Brown | accounting |

920b

| First Name | Last Name | Department |
|---|---|---|
| Paul | Fraser | legal |
| Andrew | Jackson | legal |
| Janet | Powel | legal |
| Stephen | Johnson | legal |

925

| ID (960) | Database Query Identifier (965) | Materialized View Identifier (970) |
|---|---|---|
| 1 | accounting-staff | accounting-MV |
| 2 | legal-staff | legal-MV |
| 3 | admin-staff-recent | admin-recent-MV |
| 4 | select HR from employeetable | HR-MV |

FIG. 9

MATERIALIZED VIEW GENERATION

BACKGROUND

Digital data may be stored in computer-readable databases. Such databases may have various structures and may store different volumes of data. Execution of database queries on databases uses time and computational resources.

BRIEF DESCRIPTION OF THE DRAWINGS

FIG. 4 shows an example correlation table.

FIG. 9 shows various stages of another example data transformation.

DETAILED DESCRIPTION

Performing repeated database queries may use significant time and computational resources. Pre-executing and caching the results of complex and frequent queries may save time and computational resources by avoiding repeated query executions. These pre-executed, cached queries may also be referred to as materialized views of the database, where "view" refers to the results obtained by executing the database query. In other words, a view is a snapshot of a database obtained by executing the database query.

A view may be described as having been materialized when the snapshot is stored or cached so that it may be referred to later without the need to re-execute the database query. Not all database versions and platforms support materialized views. Moreover, the specific implementations for obtaining materialized views are often platform-specific and not portable between various database platforms. Furthermore, given the pre-executed nature of materialized views, the option and flexibility to schedule updates to the materialized views may provide control over the currency of the data in the materialized views. Some database platforms do not allow for scheduling such updates, and in others the scheduling may be complex to implement.

In addition, often there may be several queries (i.e. a batch of queries), that are executed frequently. Generating materialized views for such a batch of queries may save time and computational resources as discussed above. However, database platforms typically do not provide adequate tools for batched generation of materialized views of these batches of frequent queries.

Figure 1:
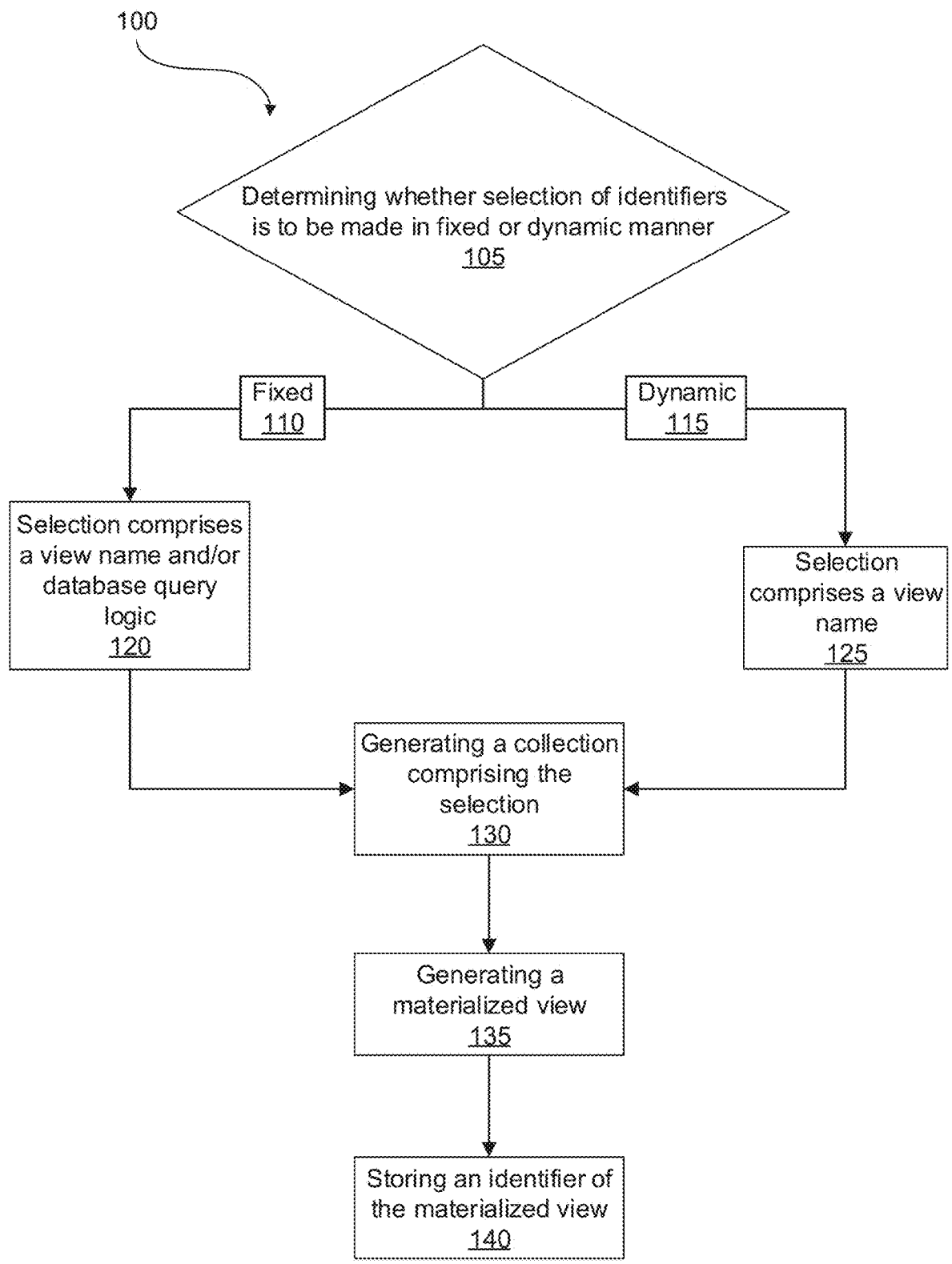
FIG. 1 shows a flowchart of an example method that may be used for generating a materialized view.

FIG. 1 shows a method 100 which may be used for generating a materialized view. Method 100 may be described in the context of a database and a stored list of database query identifiers related to the database. Database query identifiers may comprise view names and/or query logic. A view name may comprise a name or other identifier for a query or a view. Query logic, in turn, may comprise the logical query itself that may be executed to generate a view. In some examples, query logic may comprise the query syntax that may be input by a human user to cause a view to be generated. Query logic may also comprise query syntax or instructions executable by the database platforms to generate a view. In an example, the query logic may comprise Structured Query Language (SQL) query syntax specifying the view to be generated and whose execution may lead to the generation of the view. In other examples, the database query identifier may comprise other suitable identifiers for database queries.

At box 105 of method 100, a determination may be made if a selection of database query identifiers is to be made in a fixed manner or a dynamic manner. In some examples, the determination may be made by assessing whether an identifier selection indicator is set to fixed or dynamic. In other examples, the determination may be made in another suitable manner. In yet other examples, the two states may have designations other than "fixed" and "dynamic". In general, there may be two states, which may be designated using indicators or signifiers other than "fixed" and "dynamic".

Box 110 shows the case where it is determined that the database query identifiers are to be selected in a fixed manner. Moreover, box 120 shows that the selection of the database query identifiers may comprise a view name and/or database query logic.

Box 115, in turn, shows the case where it is determined that the database query identifiers are to be selected in a dynamic manner. Furthermore, box 125 shows that the selection of the database query identifiers may comprise a view name. In some examples, under the dynamic selection regime the selection may not include a database query logic.

At box 130, a collection may be generated comprising the selection from either box 120 or box 125, depending on whether the selection of identifiers is to be made in the fixed manner or dynamic manner. The selection may be made from the list of the database query identifiers related to the database. The collection may comprise a list or a one-dimensional array of the selected databased identifiers. It is also contemplated that in some examples the collection may comprise another suitable data structure.

In the case where the selection is made in the fixed manner, the collection may comprise a view name and/or query logic. The collection may also comprise multiple view names and/or multiple query logic. Database query logic may interchangeably be referred to as query logic. In some examples, at box 120 the selection of the database query identifiers comprises a predetermined set of the database query identifiers. For example, if the list of the database query identifiers comprises items 1-7, the predetermined set of the database query identifiers may comprise items 1-4 from the list of 7 items. As such, this manner of selecting the database query identifiers may be described as fixed because the selection comprises a predetermined and/or fixed selection from the list. For example, if an $8^{th}$ item is added to the list or the $7^{th}$ item is deleted, such a change would not be captured or reflected in the selection.

Furthermore, making the selection as a predetermined set of the database query identifiers in the list may not take into account whether those query identifiers are view names or query logic. A view name and/or query logic may be selected into the selection depending on the contents of the list and the given predetermined set that is used to make the selection.

Moreover, in the case where the selection is made in a dynamic manner, the collection may comprise one, two, or a larger number of view names. In some examples, at box 125 the selection may comprise one, two, or a larger number of view names which follow a predetermined naming convention. For example, the selection may comprise every view name that follows the naming convention of viewname-x, where x is a natural number. As such, this manner of selecting the database query identifiers may be described as dynamic because the selection may reflect changes in the list. If the selection comprises viewname-1, viewname-2, and viewname-3, and the list is modified to add viewname-4, then it will be recognized that viewname-4 also matches the naming convention and viewname-4 will be added to the selection.

When conformity with a view name naming convention is used to make the selection in box 125, view names that conform are selected into the selection. It is unlikely that a query logic on the list would conform to the view name naming convention, and as such it is unlikely for query logic to be selected into the selection at box 125 when conformity with a view name naming convention is used as the criterion for selection.

Furthermore, at box 135 a materialized view is generated for a given database query identifier in the collection. If the given database query identifier is a view name, the materialized view is generated by executing the query logic associated with the view name to obtain a view, and then caching or storing the view in the database or in another storage. In such a case, obtaining the view may also comprise first converting the view name into its corresponding query logic, which may then be executed to obtain the view. If the given database query identifier is in the form of query logic, the query logic may be directly executed to obtain the view which may then be stored to generate the materialized view.

In some examples, prior to box 135, a determination may be made regarding whether a given database query identifier comprises database query logic by searching the given database query identifier for a string used by a database query logic syntax. In some examples, this string may comprise a common or standard word, phrase, operator, or the like used by the database query logic syntax. For example, where the database query logic syntax comprises SQL query syntax, the string may comprise "SELECT". If "SELECT" is found in the database query identifier, then query identifier may be categorized as query logic.

At box 140, an identifier of the materialized view may be stored in association with the given database query identifier. In some examples, the identifier of the materialized view may be generated based on the corresponding database query identifier. For example, the identifier of the materialized views may be generated by applying a predetermined transformation to the corresponding databased query identifier. An example of such a transformation is described in relation to FIG. 3.

In some examples, the identifier and the database query identifier may be stored in association with one another by storing them on a common row of a correlation table. In other words, the storing the two identifiers in correlation with one another may comprise adding a row to a correlation table, the row to contain the identifier and the given database query identifier. It is contemplated that the identifier of the materialized view and the given database query identifier may be stored in association with one another using suitable methods other than storing them on a common row of a correlation table.

If the collection comprises more than one database query identifier, boxes 135 and 140 may be repeated for some or all of the identifiers such that some or all of the database query identifiers would have a corresponding materialized view and a corresponding identifier for the materialized view. These database query identifiers and the identifiers for their corresponding materialized views may then be stored in association with one another, for example in a correlation table. In this manner, a batch operation may be performed comprising generating a materialized view for the database query identifiers in the collection and generating the correlation table that relates each database query identifier to its corresponding materialized view.

By deciding when and/or how frequently the batch operation is performed, the batching process may be scheduled. Such a predetermined and/or user-selected schedule may then allow the materialized views to be updated according to the schedule.

In addition, method 100 may be portable between various database platforms which support tables and/or views. For example, method 100 may be portable between relational database platforms that support Structured Query Language (SQL) queries. This portability may arise from the use in method 100 of basic functionality that is present among various database platforms. For example, database platforms that support SQL queries provide among their basic functionality support for tables and/or views. As method 100 uses such basic functionality, it may be portable between database platforms that support SQL queries.

Figure 2:
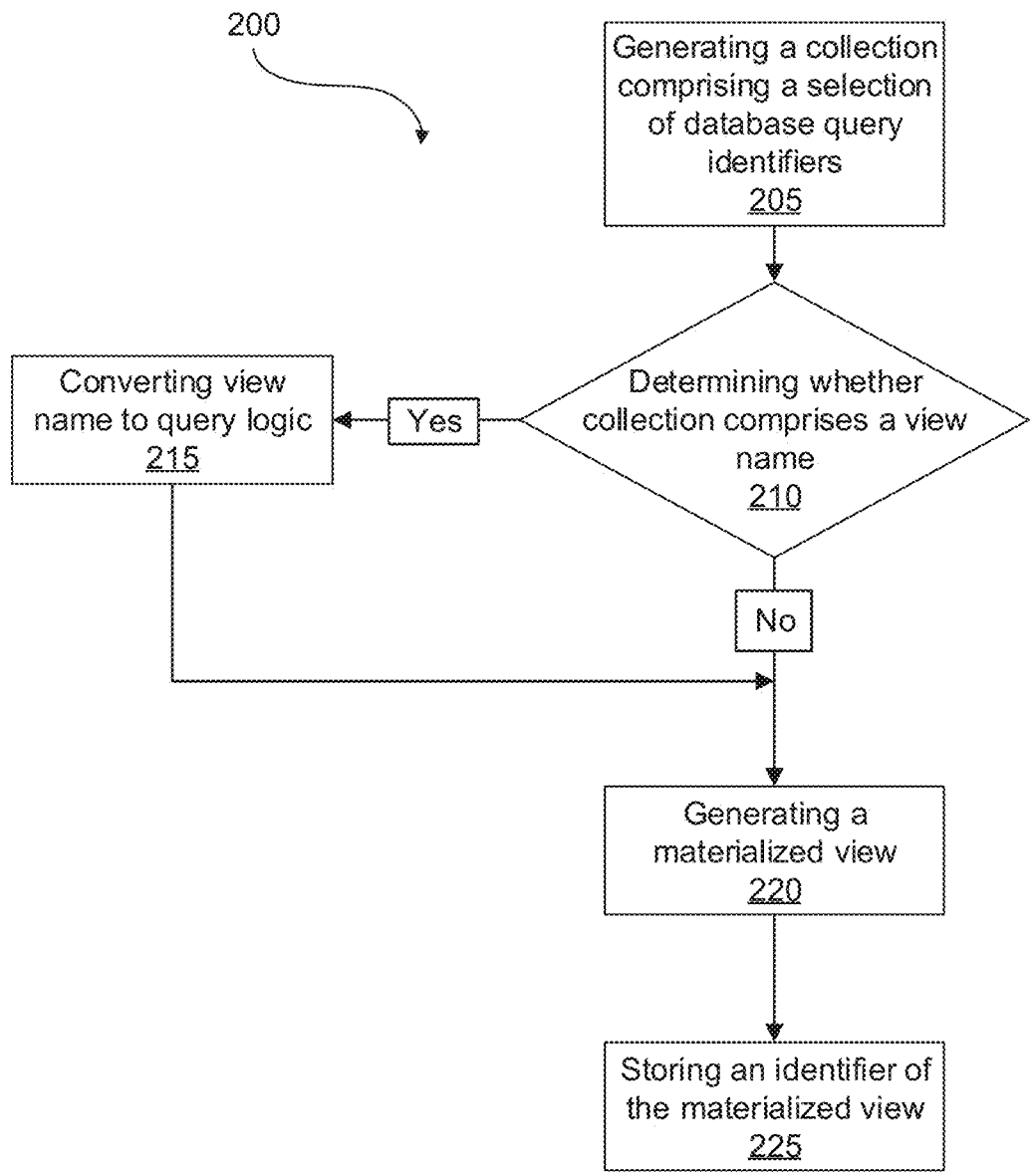
FIG. 2 shows a flowchart of another example method that may be used for generating a materialized view.

FIG. 2 shows a method 200 which may be used for generating a materialized view. At box 205 a collection comprising a selection of database query identifiers may be generated. The selection may be from a list of database query identifiers related to a database. In some examples, the selection of the database query identifiers may comprise a predetermined set of the database query identifiers, as described above.

At box 210 it may be determined if the collection comprises a view name. In some examples, this determination may be made by searching the given database query identifier for a string used by a database query logic syntax. For example, where the database query logic syntax comprises SQL query syntax, the string may comprise "SELECT". In this example, if "SELECT" is found, the database query identifier is categorized as query logic. Otherwise, the database query identifier is categorized as view name.

If the collection does comprise a view name, then at box 215 the view name is converted to its corresponding query logic, at which point the method moves to box 220. In some examples, this operation may be used to convert some or all of the view names in the collection into their corresponding query logic. Moreover, in some examples, the conversion of the view names into their corresponding query logic may be performed by referring to a look-up table or other suitable data structure which stores the view names in association with their corresponding query logic.

If the collection does not contain a view name, then method 200 moves to box 220. At box 220, the materialized view may be generated for the query logic corresponding to database query identifiers in the collection. Moreover, at box 225, an identifier of the materialized view may be stored in association with the database query identifier corresponding to the materialized view. Boxes 220 and 225 may be similar to boxes 135 and 140 described in relation to method 100. In some examples where the collection comprises more than one database query identifier, boxes 220 and 225 may be repeated for some or all of the database query identifiers in the collection.

Figure 3:
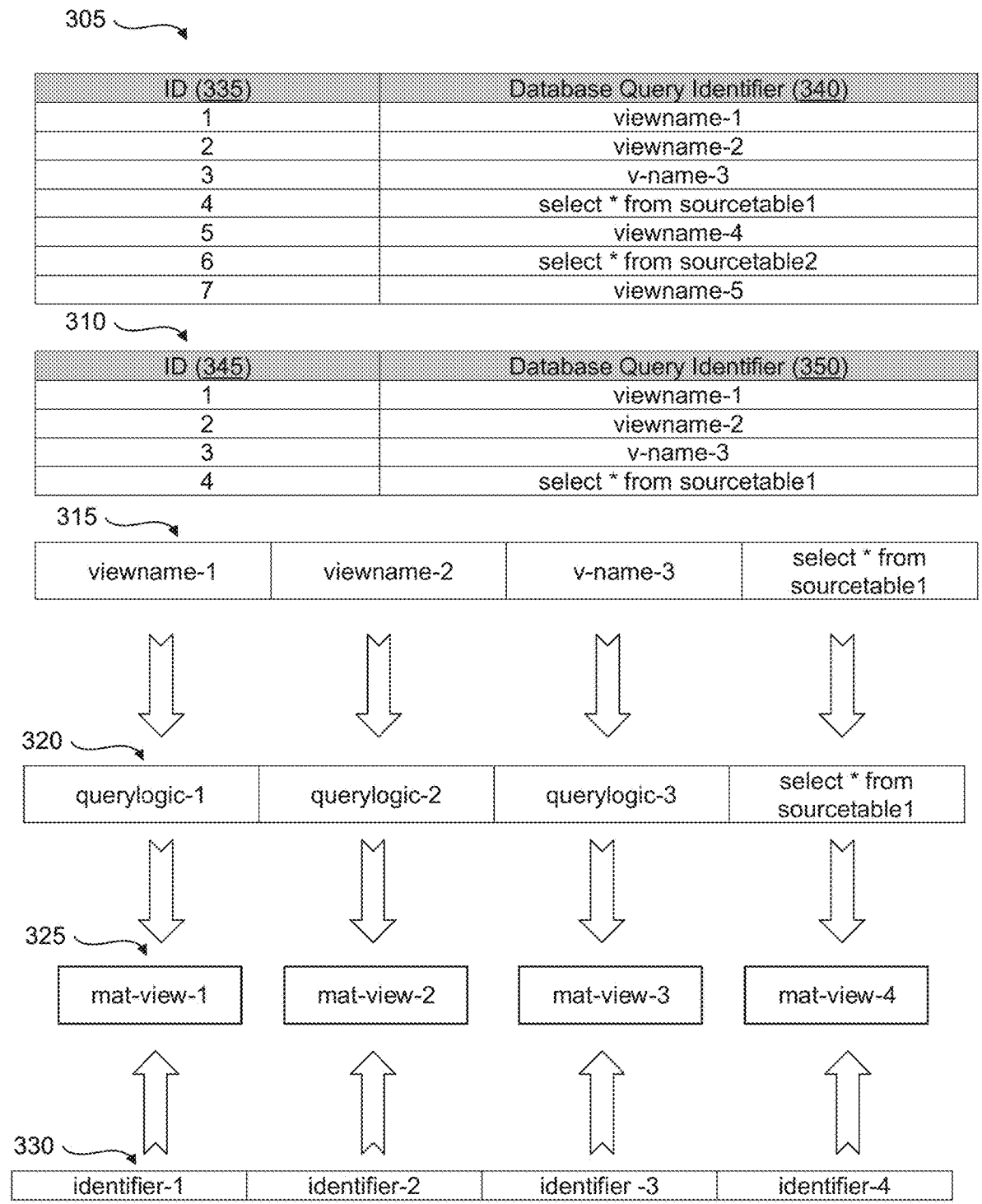
FIG. 3 shows various stages of an example data transformation.

FIG. 3 shows various stages of an example data transformation, which may be obtained, for example, by implementing method 100 or method 200. Table 305 shows a list comprising database query identifiers 340 and their corresponding IDs 335. Table 310 shows a selection of database query identifiers from the list shown in table 305. Each of these selected database query identifiers 350 may have a corresponding ID 345. This selection, represented in table 310, is made in a fixed manner, whereby to form table 310 items 1-4 are selected from the 7 items listed in table 305. Items 1-4 represent a predetermined set of the database query identifiers selected from table 305.

The selected database query identifiers 350 comprise three view names viewname-1, viewname-2, and v-name-3, and one SQL query logic "select * from sourcetable1". In some examples, table 310 may be the collection of the database query identifiers. In other examples, one-dimensional array 315 may be used as the collection. Array 315 contains the database query identifiers 350 of table 310. In yet other examples, the collection may have a data structure different than a table or a one-dimensional array.

Next, the view names in the collection, e.g. in array 315, may be identified and converted to their corresponding query logic. For example, viewname-1 is converted to "querylogic-1". "querylogic-1" is not intended to represent a syntactically correct SQL query, and is used for illustrative purposes only. "select * from sourcetable1" is already in the form of query logic, and need not be converted. Array 320 is populated with query logic corresponding to the database query identifiers in the collection, e.g. in array 315. Array 320 may also be referred to as a modified or standardized collection.

At stage 325, a materialized view is generated for each query logic in array 320. These materialized views are labelled in FIG. 3 as mat-view-1 to mat-view-4. Next, identifiers are assigned to each materialized view. These identifiers are shown in an array 330, and are labelled identifier-1 to identifier-4. Each of these identifiers for the materialized views may then be stored in association with the database query identifiers corresponding to those materialized views. For example, identifier-1 for mat-view-1 may be stored in association with viewname-1, and so on.

FIG. 4 shows a correlation table 400 which stores the materialized view identifiers 415 in association with their corresponding database query identifiers 410. Table 400 may associate the materialized view identifiers and their corresponding database query identifiers by storing them on a common row. For example, viewname-1 and its corresponding identifier-1 may be stored on the same row, along with '1' as their row ID 405.

When a batch operation is performed to generate materialized views of the database query identifiers in table 310, table 400 may provide a key to the batched materialized views. Instead of re-executing the views or queries whose identifiers are selected in table 310, table 400 may be consulted to determine the materialized view identifier, and thereby the materialized view, for each of the selected database query identifiers. Once the materialized view is found for a given database query identifier, the data in the materialized view may be reviewed or searched, which may obviate the need for re-executing the query to generate the view and obtain the data therein.

On a predetermined schedule the materialized views may be regenerated to update the contents of the materialized views to reflect changes in the data in the underlying database. Moreover, the operations and data structures shown in FIGS. 3 and 4 may represent example operations and data structures obtained by implementing methods 100 or 200.

Figure 5:
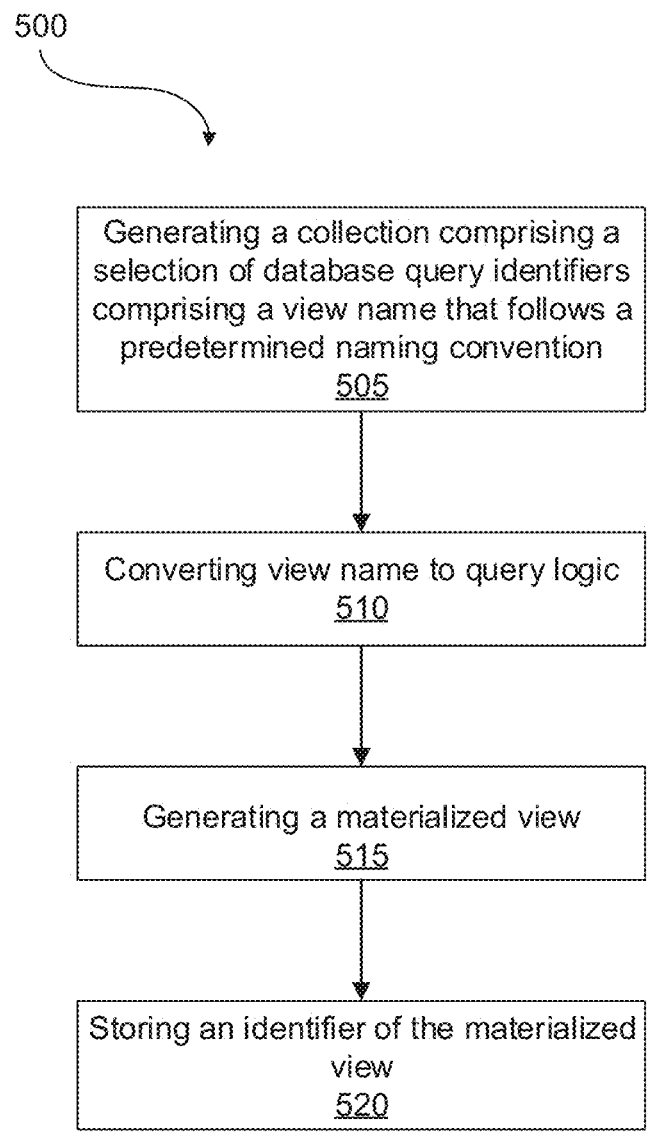
FIG. 5 shows a flowchart of yet another example method that may be used for generating a materialized view.

FIG. 5 shows a method 500 which may be used for generating a materialized view. At box 505 a collection may be generated comprising a selection of database query identifiers. The selection may comprise one, two, or a larger number of view names that follow a predetermined naming convention. For example, referring to tables 305 and 610 shown in FIG. 6, the selection may comprise view names that follow the naming convention viewname-x, where x is a natural number. Table 305 shows a list of seven database query identifiers 340. The view names that follow naming convention viewname-x may then be selected to be listed in table 610, i.e. viewname-1, viewname-2, viewname-4, and viewname-5.

View name v-name-3 in table 305, which view name does not follow the naming convention of viewname-x, is not selected for inclusion in table 610. Moreover, query logic "select * from sourcetable1" and "select * from sourcetable2" are not view names and also do not follow the viewname-x naming convention, and as such are not selected for inclusion in table 610 either.

This manner of selecting view names may represent an example dynamic manner of selecting database query identifiers for inclusion in the collection because if an additional view name of the viewname-x format is added to table 305, or if one of the view names of the viewname-x format is deleted from table 305, such additions or deletions would be reflected in table 610.

Table 610 and/or its one-dimensional array counterpart array 615 may represent an example of the collection of box 505 of method 500. Referring back to FIG. 5, at box 510 the view name(s) in the collection may be converted to corresponding query logic. At box 515, in turn, a materialized view may be generated corresponding to the query logic associated with the view name(s) in the collection. As discussed above, the materialized view may be generated by executing the query logic to obtain the view and then storing or caching the view to generate the materialized view.

In addition, at box 520 an identifier of the materialized view may be stored in association with the database query identifier corresponding to the materialized view. When there are multiple view names in the collection, boxes 510, 515, and 520 may be repeated for some or all of the view names in the collection. Moreover, in some examples boxes 515 and 520 may be similar to boxes 135 and 140 of FIG. 1 and boxes 220 and 225 of FIG. 2.

Figure 6:
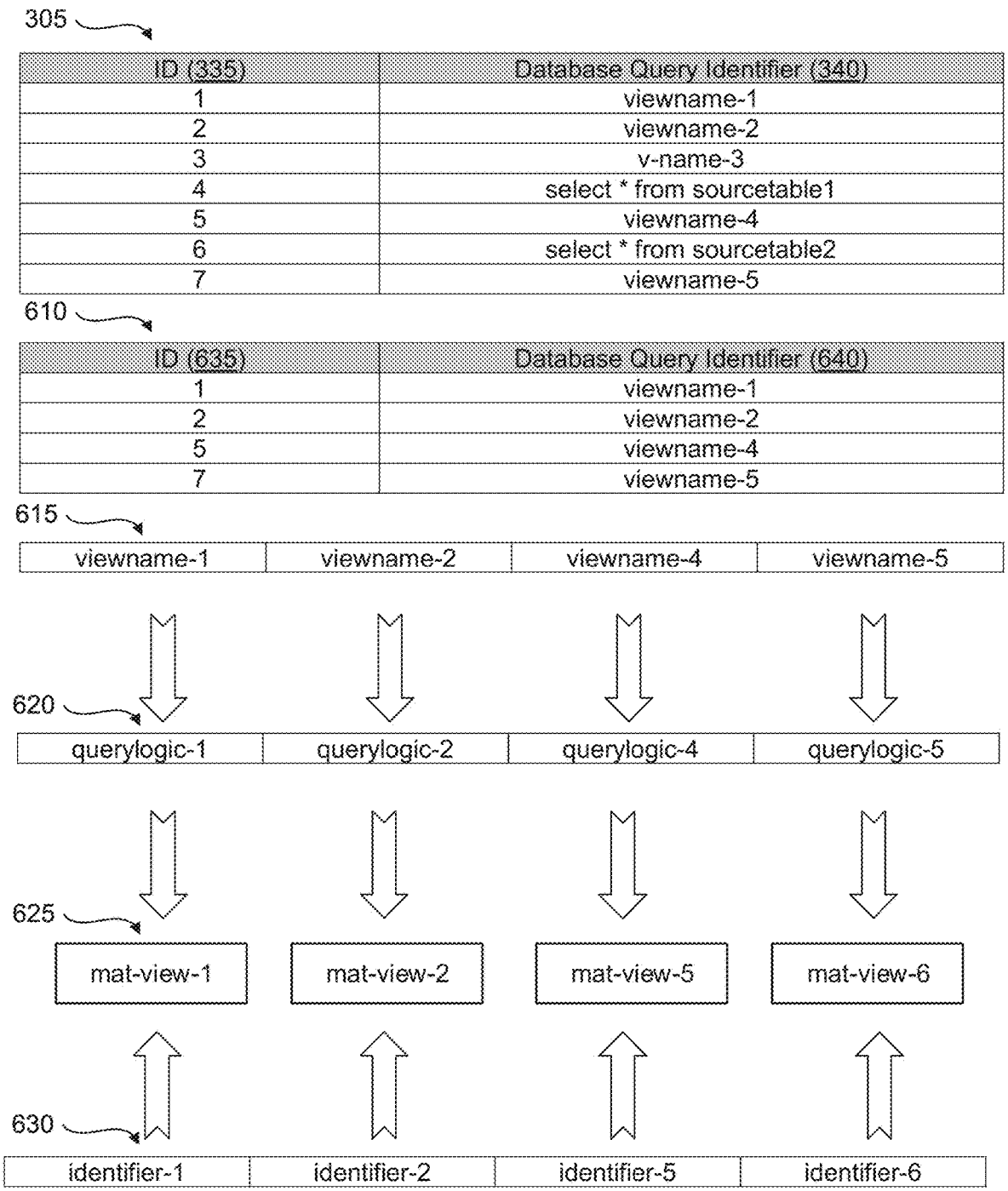
FIG. 6 shows various stages of another example data transformation.

Referring now to FIG. 6, various stages of an example data transformation are shown, which may correspond to method 500. In an example, the collection generated at box 505 of method 500 may be represented either as the table 610 or as one-dimensional array 615. Table 610 lists a selection of database query identifiers 640 and their IDs 635. Array 620, in turn, may represent example query logic generated by converting the view names in the collection, e.g. in array 615, into corresponding query logic as per box 510 of method 500.

Stage 625 shows schematic representation of materialized views corresponding to the query logic in array 620. The materialized views in stage 625 may be generated at box 515 of method 500. Moreover, array 630 shows identifiers for the materialized views shown in stage 625. These identifiers for the materialized views may be stored in association with the database query identifiers corresponding to those materialized views in box 520 of method 500. While not shown in the drawings, it is contemplated that these identifiers for materialized views and the corresponding database query identifiers may be stored in a correlation table similar to table 400 shown in FIG. 4.

The various stages of the example data transformation shown in FIG. 6 may also correspond to an example of method 100 when the selection of database query identifiers is to be made in the dynamic manner.

Figure 7:
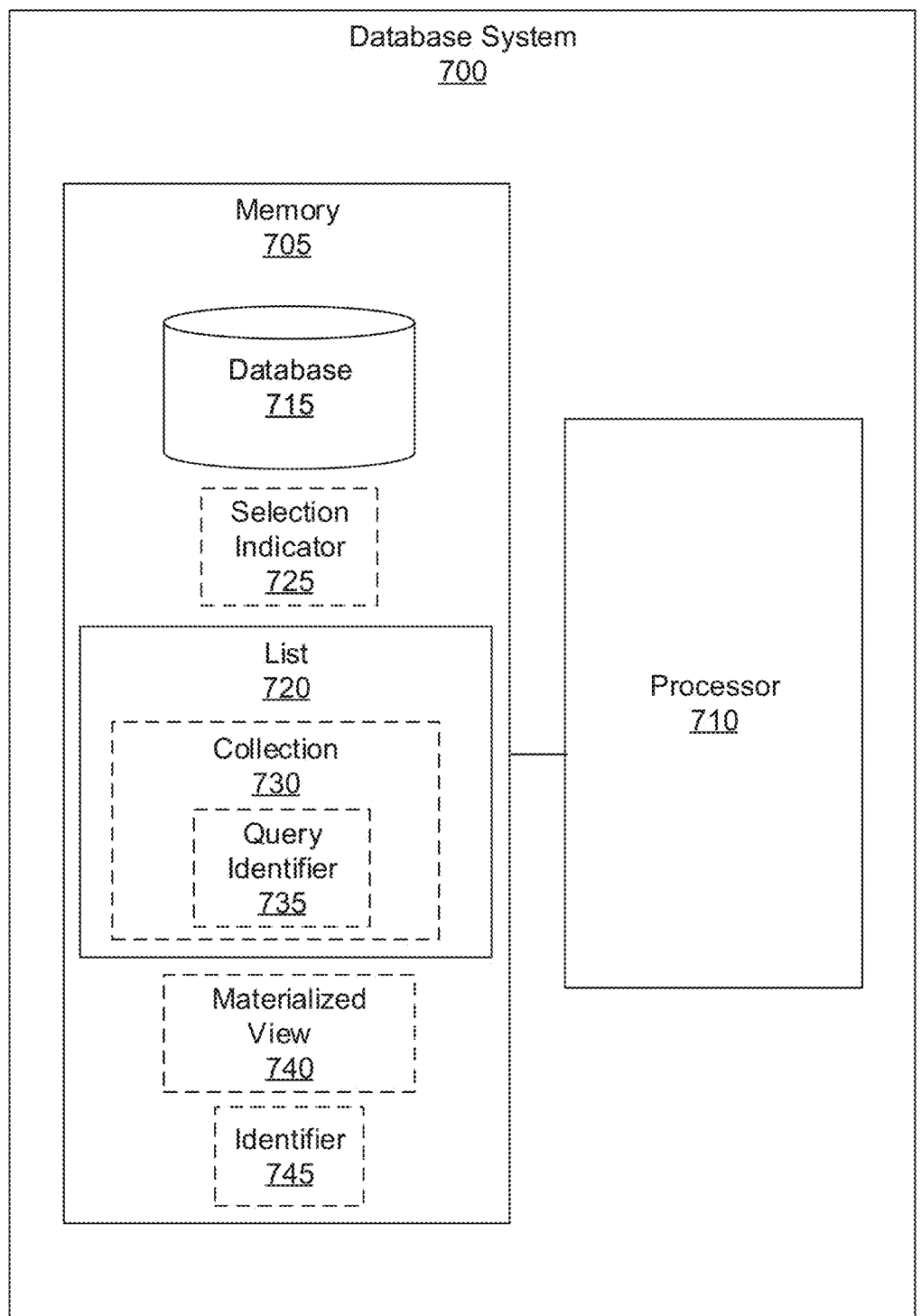
FIG. 7 shows a block diagram of an example database system.

FIG. 7 shows a database system 700 which may be used for generating a materialized view. Database system 700 may be interchangeably referred to as system 700. System 700 comprises a memory 705 which may be computer readable, and may store a database 715. System 700 may further comprise a processor 710 in communication with memory 705.

Memory 705 may include a non-transitory machine-readable storage medium that may be an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 710 may include a central processing unit (CPU), a graphics processing unit (GPU), a microcontroller, a microprocessor, a processing core, a field-programmable gate array (FPGA), or similar device capable of executing instructions. Processor 710 may cooperate with the memory 705 to execute instructions.

Processor 710 may generate a collection 730 comprising a selection of database query identifiers from a list 720 comprising database query identifiers related to the database 715. In some examples, list 720 may be stored inside database 715 or elsewhere outside of memory 705.

When an identifier selection indicator 725 is set to fixed, the selection of the database query identifiers may comprise a view name and/or database query logic. In some examples, the selection may comprise multiple view names, multiple query logic, or a combination thereof. When the identifier selection indicator 725 is set to dynamic, the selection of the database query identifiers may comprise a corresponding view name. In some examples, the selection may comprise multiple corresponding view names.

Identifier selection indicator 725 may be stored in memory 705. Moreover, identifier selection indicator 725 is shown in dashed lines to indicate that in some examples, identifier selection indicator may be stored outside of memory 705, or may be an input or a parameter that is received by system 700.

Collection 730 may comprise one, two, or a larger number of database query identifiers 735. FIG. 7 shows collection 730 inside list 720 to indicate that collection 730 comprises a selection of database query identifiers 735 from list 720. In some examples, collection 730 may comprise every database query identifier on list 720, in which case collection 730 expands to encompass the entirety of list 720. Moreover, while database query identifier 735 is shown inside collection 730, it is contemplated that list 720 may comprise database query identifiers that are not selected as part of collection 730.

In addition, collection 730 and the one, two, or a larger number of database query identifiers 735 therein are shown in dashed lines to indicate that in some examples collection 730 and its database query identifier(s) 735 may be stored inside database 715, elsewhere in memory 705 or system 700, or outside of system 700.

For a given database query identifier 735 in collection 730, processor 710 may generate a materialized view 740 corresponding to the given database query identifier 735.

Materialized view 740 may be generated when processor 710 executes the database query logic corresponding to database query identifier 735 to obtain a view, and then stores that view in memory 705. Materialized view 740 is shown in dashed lines to indicate that in some examples, materialized view may be stored in database 715, elsewhere in memory 705 or system 700, or outside of system 700.

Processor 710 may further assign an identifier 745 to materialized view 740. Identifier 745 may be stored in memory 705 in association with database query identifier 735. Identifier 745 is shown in dashed lines to indicate that in some examples identifier 745 may be stored in database 715, elsewhere in memory 705 or system 700, or outside of system 700.

While the above discussion refers to "fixed" and "dynamic" in relation to identifier selection indicator 725, it is contemplated that other signifiers or terms may be used to indicate or distinguish the two different manners of making the selection of the database query identifiers to generate collection 730.

In some examples, if identifier selection indicator 725 is set to fixed, the selection of the database query identifiers may comprise a predetermined set of the database query identifiers. Examples of this type of selection have been discussed herein in relation to FIGS. 1-4.

Moreover, in some examples, the corresponding view name may follow a predetermined naming convention. In other words, when identifier selection indicator 725 is set to dynamic, the selection of the database query identifiers may comprise view names that follow a predetermined naming convention. Examples of this type of selection and predetermined naming conventions have been discussed herein in relation to FIGS. 1, 5 and 6.

Furthermore, in some examples, before materialized view 740 is generated, processor 710 may search the database query identifier 735 for a string used by a database query logic syntax. For example, in cases where the database query logic syntax comprises SQL query syntax, the search string may comprise "SELECT". This may allow processor 710 to determine whether database query identifier 735 comprises query logic. If "SELECT" is found in database query identifier 735, then database query identifier 735 may be categorized as query logic. In cases where query logic and view names are the two expected types of database query identifiers in list 720, then the absence of "SELECT" may suggest that the database query identifier comprises a view name.

In some examples, processor 710 may apply a predetermined transformation to database query identifier 735 to generate identifier 745. For example, referring to FIG. 6, to obtain the identifiers shown in array 630, a transformation may be applied to the view names in array 615 whereby "viewname" is replaced by "identifier". For instance, "identifier-1" may be obtained by transforming, i.e. replacing "viewname" with "identifier", in "viewname-1".

In addition, in some examples, a row may be added to a correlation table to store identifier 745 in association with database query identifier 735. The row may contain identifier 745 and database query identifier 735 associated with identifier 745. An example of such a correlation table is shown in FIG. 4. In examples where collection 730 comprises multiple database query identifiers, processor 710 may, for some of all of the database query identifiers in the collection, generate a materialized view, assign an identifier to the materialized view, and store the identifier in association with the corresponding database query identifier.

In some examples, system 700 may comprise some or all of the features described herein, and/or may perform some or all of the functions and methods described herein.

Figure 8:
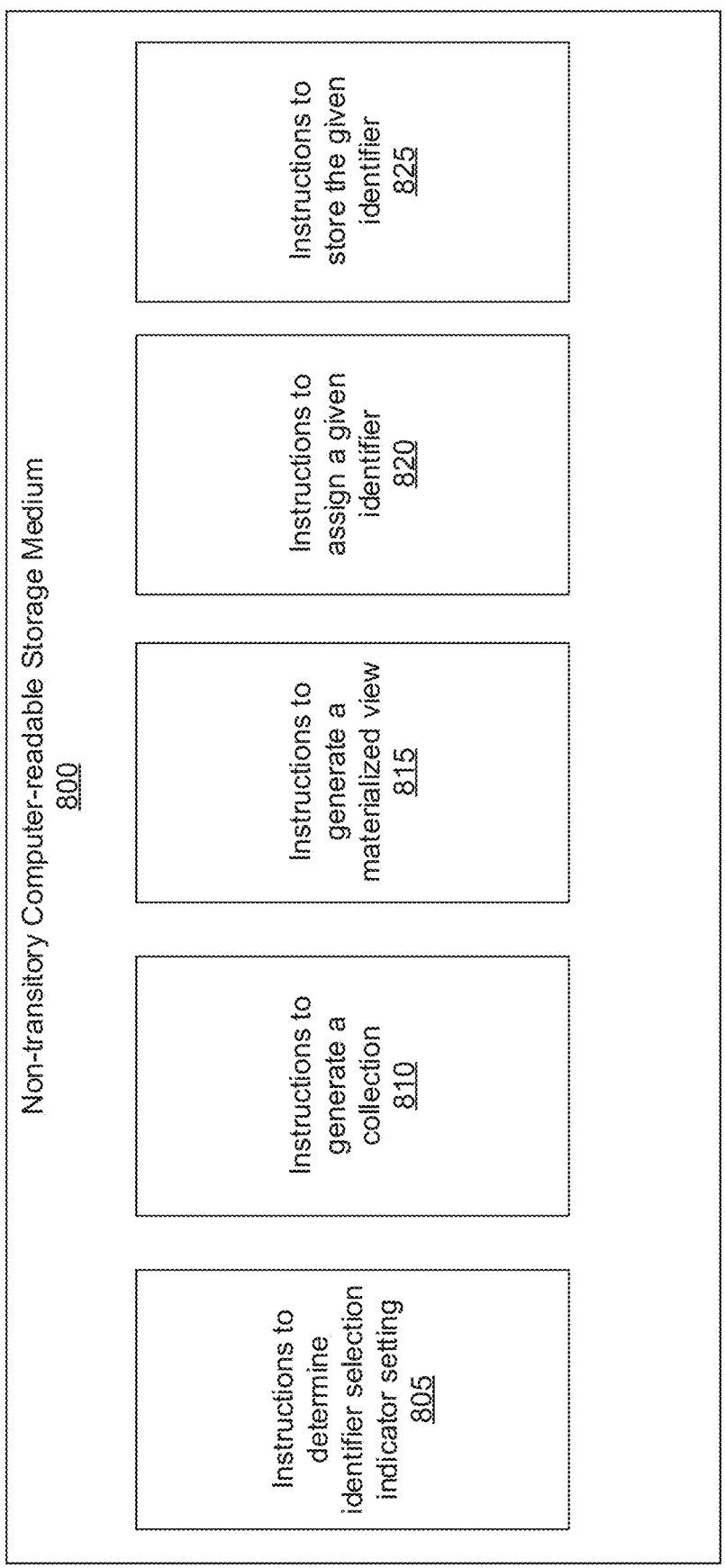
FIG. 8 shows a block diagram of an example computer-readable storage medium.

FIG. 8 shows a schematic representation of a non-transitory computer-readable storage medium (CRSM) 800 which comprises instructions executable by a processor. The CRSM may comprise an electronic, magnetic, optical, or other physical storage device that stores executable instructions. The instructions may comprise instructions to cause the processor to determine an identifier selection indicator's setting 805. For example, the instructions may cause the processor to determine if the identifier selection indicator is set to fixed or dynamic. In some examples, the two states for the identifier selection indicator may be designated using terms or signifiers other than "fixed" and "dynamic". The identifier selection indicator may be stored in memory in communication with the processor. Moreover, the identifier selection indicator may also be received by the processor as an input from an external source.

CRSM 800 may further comprise instructions to cause the processor to generate a collection 810. For example, the instruction may cause the processor to generate the collection comprising a selection of database query identifiers from a list comprising database query identifiers related to a database. When the identifier selection indicator is set to fixed, the selection of the database query identifiers may comprise a view name and/or database query logic. Moreover, when the identifier selection indicator is set to dynamic, the selection of the database query identifiers may comprise a corresponding view name following a predetermined naming convention. For example, an example predetermined naming convention has been discussed herein in relation to FIGS. 5 and 6.

In addition, CRSM 800 may comprise instructions to, for a given database query identifier in the collection, cause the processor to generate a materialized view 815. For example, the instructions may cause the processor to generate the materialized view corresponding to the given database query identifier. CRSM 800 may also comprise instructions to cause a processor to assign a given identifier 820. For example, the instructions may cause the processor to assign the given identifier to the materialized view. Moreover, CRSM 800 may comprise instructions to cause a processor to store the given identifier 825. For example, the instructions may cause the processor to store the given identifier in association with the given database query identifier. Examples of generation of the materialized view, assignment of an identifier, and storage of the identifier in association with the database query identifier have been discussed herein in relation to FIGS. 1-7.

Moreover, in some examples CRSM 800, and the instructions stored therein, may cause a processor to perform a selection of or all of the functions of the methods and systems described therein.

In some example CRSMs, if the identifier selection indicator is set to fixed, the selection of the database query identifiers may comprise a predetermined set of the database query identifiers. Moreover, in some example CRSMs the instructions may comprise further instructions to cause the processor to, before the materialized view is generated, search the given database query identifier for a string used by a database query logic syntax. For example, the database query logic syntax may comprise SQL query syntax and the string may comprise "SELECT". Examples have been discussed herein in relation to FIGS. 1-4 and 7.

Furthermore, in some example CRSMs a predetermined transformation may be applied to the given database query identifier to generate the given identifier. An example of the predetermined transformation has been discussed herein in relation to FIGS. 3 and 6.

In some example CRSMs the instructions to store the given identifier in association with the given database query identifier may comprise instructions to add a row to a correlation table. The row may contain the given identifier and the given database query identifier associated with the given identifier. An example of the correlation table has been discussed herein in relation to FIG. 4.

FIG. 9 shows various stages of an example data transformation, which may correspond to the methods, systems, and CRSMs discussed herein. FIG. 9 is presented in the context of employee data for an organization. The employee data may be stored in an employee database (not shown). This example database may store personal and contact information for the employees in association with the employees' respective departments in the organization. For example, the employees may variously belong to different departments such as accounting, legal, administrative, HR, sales, engineering, finance, and the like.

The human resources department of the organization may frequently query the employee database to obtain information, or database views, listing the staff or employees in a given department. For example, table 905 shows a list of seven database query identifiers 935, and their corresponding IDs 930, related to the employee database. The first database query identifier "accounting-staff" may comprise a view name associated with a database query that upon execution retrieves from the employee database a list of the employees in the accounting department. The second, fifth, and seventh database query identifiers may provide similar functionality for different respective departments.

Similarly, the third database query identifier "admin-staff-recent" may comprise a view name associated with a database query that upon execution retrieves from the employee database a list of the employees in the administration department who were hired in the past year.

The fourth and sixth database query identifiers are in the form of database query logic. The query logic shown in FIG. 9 is for illustrative purposes and is not intended to represent syntactically correct database query logic. For example, the sixth database query identifier "select engineering from employeetable" illustrates query logic indicating that information for employees in the engineering department is to be retrieved from an "employeetable". "employeetable", in turn, may represent a portion or all of the employee database. The fourth database query identifier may be similar, but for a different department.

Table 910, in turn, shows a selection of database query identifiers 945, and their associated IDs 940, selected from the list shown in table 905. The selection may be made in a fixed manner, for example as a predetermined set of the first four database query identifiers in table 905. As shown in FIG. 9, the selection in table 910 may capture both view names such as "accounting-staff" and database query logic such as "select HR from employeetable".

Moreover, table 915 shows a selection of database query identifiers 955, and their associated IDs 950, selected from the list shown in table 905. The selection may be made in a dynamic manner, for example by selecting from table 905 the database query identifiers 955 which comprise view names that follow the naming convention y-staff, where 'y' represents the name of the department in the organization.

Tables 910 and 915 may represent selections corresponding to frequently executed queries or views of the employee database. A collection of database query identifiers may then be generated. This collection may comprise the selection of database query identifiers as shown in table 910 or table 915. The database queries corresponding to the database query identifiers in the collection may then be executed or computed to obtain the corresponding query results or views.

For example, referring to table 910, when the database query corresponding to database query identifier "accounting-staff" is executed, the view shown in table 920*a* may be obtained. Table 920*a* lists the first and last names of the employees in the accounting department. Similarly, when the database query corresponding to database query identifier "legal-staff" is executed, the view shown in table 920*b* may be obtained. Table 920*b* lists the first and last names of the employees in the legal department. The views shown in tables 920*a* and 920*b* may be stored to generate materialized views. While not shown in FIG. 9, similar views may be obtained for the other database query identifiers in tables 910 and 915.

An identifier may be assigned to and/or stored in association with the materialized views. For example, the materialized view shown in table 920*a* may be assigned an identifier "accounting-MV" and the materialized view shown n table 920*b* may be assigned an identifier "legal-MV". Table 925 shows materialized view identifiers 970 associated with corresponding database query identifiers 965 and their IDs 960. Table 925 corresponds to the selection of database query identifiers shown in table 910. While not shown in FIG. 9, a table similar to table 925 may be generated corresponding to the database query identifiers shown in table 915. Moreover, while not shown in FIG. 9, the example data transformation shown in FIG. 9 may comprise arrays and stages similar to arrays 315, 320, and 330 and stage 325 shown in FIG. 3 and/or arrays 615, 620, and 630 and stage 625 shown in FIG. 6.

In order to obtain a list of employees who work in the accounting department of the organization, table 925 may be consulted and a materialized view as illustrated for example in table 920*a* may be retrieved from memory. These operations may use less time and/or computational resources compared to executing the database query corresponding to the "accounting-staff" database query identifier.

As discussed above, tables 910 and 915 may represent selections corresponding to frequently executed queries or views of the employee database. The organization may use the methods, systems and CRSMs described herein to generate materialized views corresponding to these frequently executed views in order to reduce the time and computational resources used by repeated execution of database queries.

If the organization changes its information technology infrastructure by, for example, changing its database provider or platform for the employee database, the organization may seek to port its methods for generating materialized views to the new database platform. This new platform may have rules, conventions, or capabilities different from those of the organization's old database platform. The old and the new database platforms may have standard and/or common functionalities that may be similar or the same between the platforms, and platform-specific functionalities that may be different between the platforms.

The methods, systems, and CRSMs described herein may increase the likelihood of portability to a new database platform because they use functionalities that are standard and/or common among many database platforms. In some examples, the methods described herein use the capability of database platforms to generate views, which capability may be common or standard among many database platforms.

Furthermore, the methods, systems, and CRSMs described herein may allow for generation of materialized views for a selection of database query identifiers made in a fixed or dynamic manner. The fixed manner of selection may provide the flexibility of selecting and generating materialized views for both view names and query logic. The dynamic manner of selection, in turn, may allow the selection to capture changes to the list. For example, when the selection is made by choosing from the list view names that follow a predetermined naming convention, addition or deletion of conforming view names to the list may be reflected in the selection, thereby obviating the need for reprogramming or changes to the methods described herein in order to capture in the selection the changes to the list.

In addition, the selections of database query identifiers shown in tables 910 and 915 may comprise multiple, or batches of, database query identifiers. Initiating one by one the generation of materialized views for the database query identifiers in the batch may be time-consuming. The methods, systems, and CRSMs described herein may allow for batch generation of materialized views. Once a selection of database query identifiers are made, for example the selections shown in tables 910 and 915, the methods described herein may be initiated once and then proceed to generate a materialized view and store a materialized view identifier in association with the corresponding database query identifier, for the database query identifiers in the selection.

Furthermore, using the example of the employees database, as the organization hires or fires employees and the information in the employee database changes, the materialized views generated prior to the hiring and/or firing may become outdated. By providing the ability to control when the methods described herein are initiated, the methods, systems, and CRSMs described herein may allow for scheduling updates to the materialized views. The initiation of the methods may be set to a predetermined schedule or frequency, triggered by external events such as employee hiring or firing, and/or performed on demand.

The methods, systems, and CRSMs described herein may include the features and/or perform the functions described herein in association with the other methods, systems, and/or CRSMs described herein. Furthermore, the methods, systems, and CRSMs described herein may allow for generation of database materialized views in a manner that may be batched, scheduled, and portable among various database platforms.

In some examples, the methods, systems, and CRSMs described herein may be applicable to database platforms that have the ability to generate tables and/or views. Moreover, in some examples, the methods, systems, and CRSMs described herein may be applicable to database platforms that are SQL-based and/or that may execute SQL database queries.

Moreover, it should be recognized that features and aspects of the various examples provided above may be combined into further examples that also fall within the scope of the present disclosure.

The invention claimed is:

1. A method comprising:
   determining whether a selection of database query identifiers is to be made in a fixed manner or a dynamic manner;
   generating a collection comprising the selection from a list comprising database query identifiers related to a database, the list to associate the database query identifiers with view names and expressions of executable database query logic, wherein the selection of the database query identifiers comprises a number of database query identifiers selected from the list irrespective of view name and database query logic when the selection is to be made in the fixed manner, and wherein the selection of the database query identifiers comprises a set of database query identifiers selected from the list based on a view naming convention when the selection is to be made in the dynamic manner;

generating materialized views of the database query identifiers in the collection; and storing an identifier of a materialized view in association with a given database query identifier.

2. The method of claim 1, wherein the selection is to select database query identifiers corresponding to the most frequently executed queries.

3. The method of claim 1 further comprising, prior to the generating, converting the database query identifiers into corresponding database query logic.

4. The method of claim 1, further comprising, prior to the generating, determining whether the given database query identifier comprises database query logic by searching the given database query identifier for a string used by a database query logic syntax.

5. The method of claim 1, wherein the identifier is generated by applying a predetermined transformation to the given database query identifier.

6. The method of claim 1, wherein the storing the identifier in association with the given database query identifier comprises adding a row to a correlation table, the row containing the identifier and the given database query identifier.

7. A database system comprising:

a memory being computer-readable, the memory to store a database;

a processor in communication with the memory, the processor to:

generate a collection comprising a selection of database query identifiers from a list comprising database query identifiers related to the database, the list to associate the database query identifiers with view names and expressions of executable database query logic, wherein the selection of the database query identifiers comprises a number of database query identifiers selected from the list irrespective of view name and database query logic when an identifier selection indicator is set to fixed, and wherein the selection of the database query identifiers comprises a set of database query identifiers selected from the list based on a view naming convention when the identifier selection indicator is set to dynamic; and for a given database query identifier in the collection:

generate a materialized view corresponding to the given database query identifier;

assign a given identifier to the materialized view; and store the given identifier in association with the given database query identifier.

8. The database system of claim 7, wherein the selection is to select database query identifiers corresponding to the most frequently executed queries.

9. The database system of claim 7, wherein, before the materialized view is generated, the processor is further to search the given database query identifier for a string used by a database query logic syntax.

10. The database system of claim 9, wherein the database query logic syntax comprises Structured Query Language (SQL) query syntax and the string comprises "SELECT".

11. The database system of claim 7, wherein a predetermined transformation is applied to the given database query identifier to generate the given identifier.

12. The database system of claim 7, wherein a row is added to a correlation table to store the given identifier in association with the given database query identifier, the row containing the given identifier and the given database query identifier associated with the given identifier.

13. A non-transitory computer-readable storage medium comprising instructions executable by a processor, the instructions to cause the processor to:

determine whether an identifier selection indicator is set to fixed or dynamic;

generate a collection comprising a selection of database query identifiers from a list comprising database query identifiers related to a database, the list to associate the database query identifiers with view names and expressions of executable database query logic, wherein the selection of the database query identifiers comprises a number of database query identifiers selected from the list irrespective of view name and database query logic when the identifier selection indicator is set to fixed, and wherein the selection of the database query identifiers comprises a set of database query identifiers selected from the list based on a view name following a predetermined naming convention when the identifier selection indicator is set to dynamic; and for a given database query identifier in the collection:

generate a materialized view corresponding to the given database query identifier;

assign a given identifier to the materialized view; and store the given identifier in association with the given database query identifier.

14. The non-transitory computer readable storage medium of claim 13, wherein the selection is to select database query identifiers corresponding to the most frequently executed queries.

15. The non-transitory computer readable storage medium of claim 13, the instructions comprise further instructions to cause the processor to, before the materialized view is generated, search the given database query identifier for a string used by a database query logic syntax.

16. The non-transitory computer readable storage medium of claim 15, wherein the database query logic syntax comprises SQL query syntax and the string comprises "SELECT".

17. The non-transitory computer readable storage medium of claim 13, wherein a predetermined transformation is applied to the given database query identifier to generate the given identifier.

18. The non-transitory computer readable storage medium of claim 13, wherein the instructions to store the given identifier in association with the given database query identifier comprise instructions to add a row to a correlation table, the row containing the given identifier and the given database query identifier associated with the given identifier.

* * * * *